(12) United States Patent
Shufer et al.

(10) Patent No.: US 11,847,447 B2
(45) Date of Patent: Dec. 19, 2023

(54) ANOMALY IDENTIFICATION WITHIN SOFTWARE PROJECT UNDER DEVELOPMENT

(71) Applicant: MICRO FOCUS LLC, Santa Clara, CA (US)

(72) Inventors: Ilan Shufer, Yehud (IL); Tom Vaingart, Yehud (IL); Sigal Ishay, Yehud (IL)

(73) Assignee: Micro Focus LLC, Santa Clara, CA (US)

( * ) Notice: Subject to any disclaimer, the term of this patent is extended or adjusted under 35 U.S.C. 154(b) by 0 days.

(21) Appl. No.: 17/363,853

(22) Filed: Jun. 30, 2021

(65) Prior Publication Data
US 2023/0004383 A1    Jan. 5, 2023

(51) Int. Cl.
G06F 8/77      (2018.01)
G06F 11/36     (2006.01)

(52) U.S. Cl.
CPC ............ G06F 8/77 (2013.01); G06F 11/3668 (2013.01)

(58) Field of Classification Search
None
See application file for complete search history.

(56) References Cited

U.S. PATENT DOCUMENTS

| | | | |
|---|---|---|---|
| 5,655,074 A * | 8/1997 | Rauscher | G06F 11/3616 702/179 |
| 8,423,960 B2 | 4/2013 | Farchi et al. | |
| 8,473,907 B1 * | 6/2013 | Zandi | G06F 11/3616 714/38.1 |
| 9,715,441 B2 | 7/2017 | Rajamanickam et al. | |
| 9,946,633 B2 | 4/2018 | Atyam et al. | |
| 10,055,337 B2 | 8/2018 | Rosomoff | |

(Continued)

OTHER PUBLICATIONS

M. Ulan et al., "Quality Models Inside Out: Interactive Visualization of Software Metrics by Means of Joint Probabilities," 2018 IEEE Working Conference on Software Visualization (VISSOFT), 2018, pp. 65-75, doi: 10.1109/VISSOFT.2018.00015. (Year: 2018).*

(Continued)

*Primary Examiner* — Andrew M. Lyons
(74) *Attorney, Agent, or Firm* — Sheridan Ross P.C.

(57) ABSTRACT

Quality indicators regarding a software project under development that has a plurality of functional areas are collected. Each quality indicator is normalized to a coverage of the functional area of the software project to which the quality indicator corresponds. The normalized quality indicators are correlated to previously identified anomalies of the software project, yielding an anomaly indicative value for each normalized quality indicator corresponding to a probability that the normalized quality indicator is revelatory of unidentified anomalies of the software project. A normal behavior for each normalized quality indicator is estimated. For each functional area of the software project, an anomaly score indicative of a likelihood of an unidentified anomaly within the functional area is calculated. The anomaly score is based on, for each normalized quality indicator corresponding to the functional area, how the normalized quality indicator departs from its estimated normal behavior as weighted by its anomaly indicative value.

20 Claims, 6 Drawing Sheets

(56) References Cited

U.S. PATENT DOCUMENTS

| | | | |
|---|---|---|---|
| 10,261,870 | B2 | 4/2019 | Cmielowski et al. |
| 10,394,697 | B2 | 8/2019 | Atyam et al. |
| 10,664,380 | B2 | 5/2020 | Wright et al. |
| 10,754,640 | B2 | 8/2020 | Woulfe et al. |
| 11,227,047 | B1* | 1/2022 | Vashisht ............... G06F 21/552 |
| 11,403,164 | B2* | 8/2022 | Sghiouer ............... G06F 11/34 |
| 2011/0055798 | A1* | 3/2011 | Kraft ................... G06F 11/3604 |
| | | | 717/100 |
| 2013/0232472 | A1* | 9/2013 | Korner ...................... G06F 8/77 |
| | | | 717/127 |
| 2014/0123110 | A1* | 5/2014 | Wan .................... G06F 11/3672 |
| | | | 717/124 |
| 2016/0378618 | A1* | 12/2016 | Cmielowski ........ G06F 11/1479 |
| | | | 714/38.1 |
| 2017/0052880 | A1* | 2/2017 | Rosomoff ................. G06F 8/70 |
| 2017/0091078 | A1* | 3/2017 | Atyam ................ G06F 11/3616 |
| 2017/0235662 | A1* | 8/2017 | Leask ................... G06F 11/302 |
| | | | 717/125 |
| 2019/0188584 | A1* | 6/2019 | Rao ..................... G05B 19/4184 |
| 2019/0205542 | A1* | 7/2019 | Kao ............................ G06F 8/10 |
| 2019/0294428 | A1* | 9/2019 | Scheiner ................. H04L 67/34 |
| 2020/0053108 | A1* | 2/2020 | Cili ..................... H04L 63/1441 |
| 2020/0133830 | A1* | 4/2020 | Sharma ............... G06F 11/3676 |
| 2021/0232484 | A1* | 7/2021 | Keneally ................... G06F 9/54 |
| 2021/0374033 | A1* | 12/2021 | Yang ..................... G06F 11/328 |
| 2021/0374614 | A1* | 12/2021 | Sampaio ................ G06N 20/00 |
| 2022/0276860 | A1* | 9/2022 | Balasubramanian ..... G06F 8/70 |
| 2022/0300280 | A1* | 9/2022 | Rafey ................. G06F 11/3604 |
| 2022/0327495 | A1* | 10/2022 | Allison, III ........ G06Q 10/1095 |
| 2022/0342663 | A1* | 10/2022 | Barkaee .................... G06F 8/77 |
| 2022/0391203 | A1* | 12/2022 | Ichii .......................... G06F 8/75 |
| 2023/0179501 | A1* | 6/2023 | Kang .................. H04L 41/5025 |
| | | | 709/224 |

OTHER PUBLICATIONS

M. Jiang, M. A. Munawar, T. Reidemeister and P. A. S. Ward, "Efficient Fault Detection and Diagnosis in Complex Software Systems with Information—Theoretic Monitoring," in IEEE Transactions on Dependable and Secure Computing, vol. 8, No. 4, pp. 510-522, Jul.-Aug. 2011, doi: 10.1109/TDSC.2011.16. (Year: 2011).*

N. Nagappan, T. Ball and B. Murphy, "Using Historical In-Process and Product Metrics for Early Estimation of Software Failures," 2006 17th International Symposium on Software Reliability Engineering, Raleigh, NC, USA, 2006, pp. 62-74, doi: 10.1109/ISSRE.2006.50. (Year: 2006).*

M. Ulan et al., "Quality Models Inside Out: Interactive Visualization of Software Metrics by Means of Joint Probabilities," 2018 IEEE Working Conference on Software Visualization (VISSOFT), Madrid, Spain, 2018, pp. 65-75, doi: 10.1109/VISSOFT.2018.00015. (Year: 2018).*

* cited by examiner

ANOMALY IDENTIFICATION WITHIN SOFTWARE PROJECT UNDER DEVELOPMENT

BACKGROUND

Computing systems made up of one or multiple computing devices, including server, desktop, laptop, and notebook computers, mobile computing devices such as smartphones and tablet computing devices, and other types of computing devices, run software, or computer programs, to perform intended functionality. As computing systems have increased in computing power and connectivity, the complexity of such software projects has greatly increased as well. Developing software projects has become an increasingly evolved process, involving large numbers of developers, testers, and other users to quickly roll out sophisticated software as defect-free as possible.

DETAILED DESCRIPTION

Figure 1:
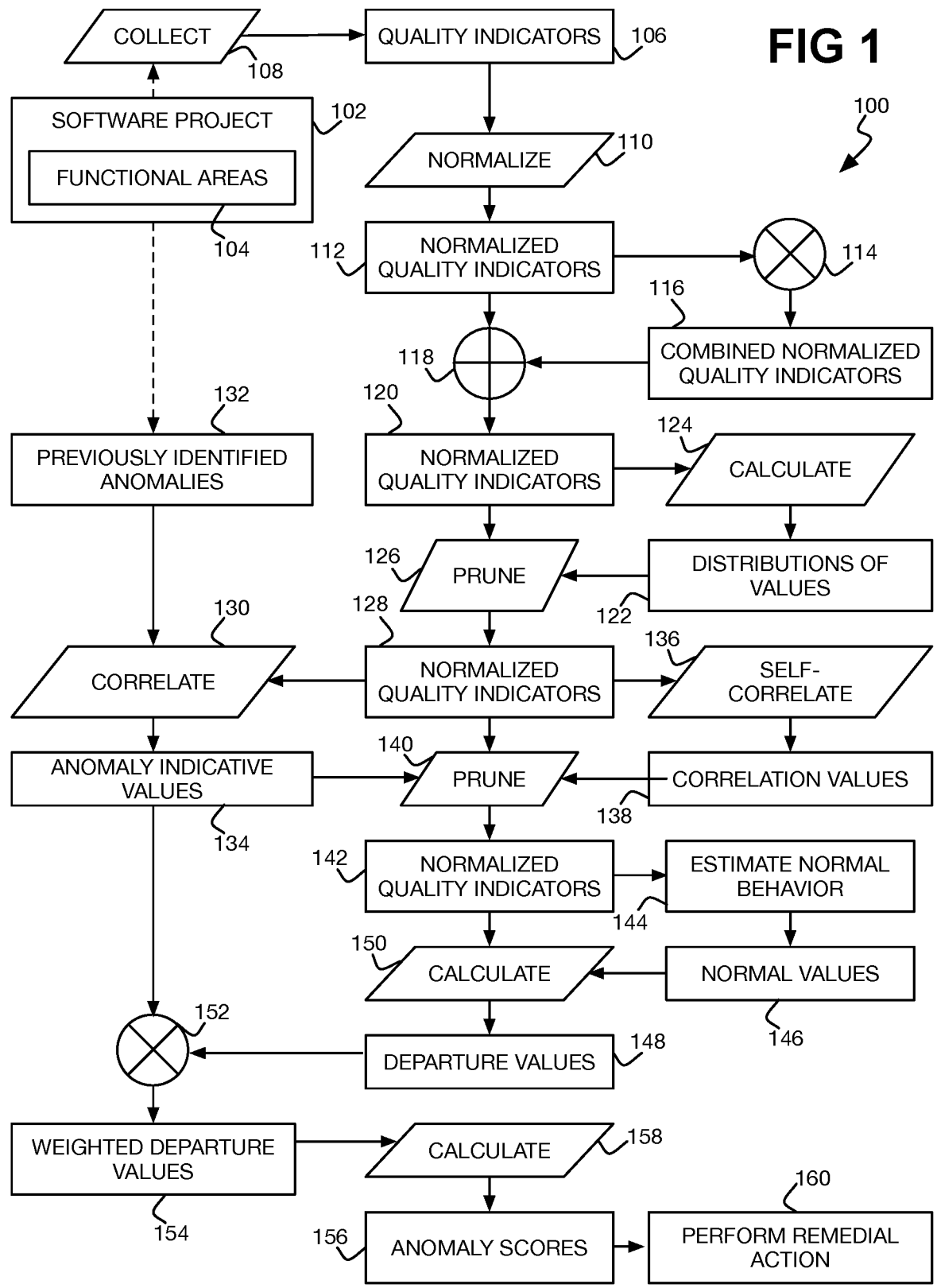
FIG. 1 is a diagram of an example process for identifying anomalies within a software project under development.

Development of a software project can be a complex process involving many developers working on different functional areas of the software project and many testers testing the functional areas individually as well as the interoperability of the functional areas. Software project development has increasingly occurred at faster speed, with smaller, more frequent releases of software projects. Software development methodologies such as agile development, which focuses on discovering requirements and developing solutions through collaborative effort and continual improvement, as well DevOps, which combines software development ("Dev") and information technology operations ("Ops"), have further shortened software project development lifecycles.

Such accelerated software project development has shortened the time available to detect and address software project defects. Therefore, quality assurance personnel have to identify which functional areas in an application are at high risk for potential defects so that testing activities are focused on such areas. Identifying functional areas of a software project that are at risk, however, is difficult, typically involving subjectivity in the face of large amounts of data. Inaccuracy in identifying areas of a software project that are at high risk for defects can mean that actual defects remain undetected and are present when the software project is released, affecting the ability of the software to operate for its intended purpose.

Risk estimation has traditionally focused on two ways for identifying functional areas of a software project that are at high risk for potential defects. First, a quality assurance expert may manually inspect various quality indicators collected during the software development process, and attempt to discern which functional areas are at risk for defects. However, such an approach relies upon the skill of the expert, whose knowledge may be uneven across different types of software projects and even different types of types of indicators. This approach therefore introduces subjectivity into the risk estimation process that may not provide a sound manner for high risk functional areas across different software project domains.

Second, a supervised technique relying on an algorithm or model, such as linear regression, a deep neural network, and so on, can be used that has to be initially trained before deployment for actual estimation of high risk functional areas within a software project. Such a supervised technique can require elaborate and laborious construction. Experts have to painstakingly tag quality indicators collected during the development process of many software projects to specify whether the indicators correspond to functional areas at high risk of defects or not. Such tagged, or supervised, training data is then used to train the algorithm or model. Failure to collect sufficient training data, or failure to collect accurate training data, can result in this approach not accurately identifying high risk functional areas of different software projects.

Techniques described herein ameliorate these and other issues. The described techniques provide a way to identify anomalies within a software project under development, such a defects and other anomalies, based on quality indicators regarding the software project that are collected during the development process. Specifically, the techniques calculate anomaly scores that are indicative of the likelihood of unidentified anomalies within functional areas of the software project. The functional areas having higher anomaly scores are more likely to be anomalous (i.e., contain anomalies in how the functional areas operate or perform, and therefore are at higher risk of having quality issues), and thus are at higher risk for containing defects. The techniques do not rely on subjective manual risk assessment by quality assurance or other experts, and further are unsupervised in that no algorithm or model has to be trained a priori on the basis of laboriously tagged training data.

FIG. 1 shows an example process 100 (e.g., a method) for identifying anomalies within a software project 102 under development. The software project 102 may be composed of one or multiple computer programs, software code modules, and so on, that are interoperable to provide or perform intended functionality. The software project 102 can thus be considered as having a number of functional areas 104 that each correspond to a different function that assists in providing the overall intended functionality of the software project 102 as a whole. Different program code of the software project 102 may correspond to different functional areas 104, and the size of a functional area 104 may correspond to the size of the program code of the software project 102 for that functional area 104.

Quality indicators 106 regarding the software project 102 are collected (108) during the development of the software project 102. Quality indicators 106 can include values of different types of data that can be collected during testing of the software project 102 under development. Such quality indicators 106 can include automated test data that is regularly and frequently collected during a continuous improvement or continuous development process. Such test data can include the results of test runs, including the number of successful test runs and the number of failures. The test data can include automation coverage, as to how much each functional area 104 is covered by the automation tests in question. The test data can include how stable or instable the tests are. For instance, unstable tests and build processes generate more noisy data, which can heighten risk of anomalies in the software development process.

The quality indicators 106 can include manual test data as well. Because the program code that is tested can be traced to functional areas 104 of the software project 102 under development, the output of the tests can be related to which functional areas 104 the tests correspond. Therefore, the status of each test can be collected, as well as the overall coverage of each test. Continuous improvement or continuous development process build data can also be collected as quality indicators 106, such as the stability of test jobs performed during these processes, as well as data indicative of environmental and other types of issues.

Code changes in the software project 102 may be mapped to functional areas 104 as part of the quality indicators 106. For each code change, the data collected as part of the quality indicators 106 can include the number of commits made during development, and the committed number of program code lines. The quality indicators 106 can include scores for individual program code files reflecting the sensitivity of the files to such code changes. The quality indicators 106 can include backlog data, in that the estimated development effort of different functional areas 104 can be tracked during the development process of the software project 102. Highly sensitive files and functional areas 104 having high development effort may be more at risk for potential defects within the software project 102.

During the development process, quality issues and other anomalies, such as defects, bugs, and so on, are likely to be discovered, and can be considered in this respect as previously identified anomalies 132 within the software project 102. Such identified anomalies 132 can be used when assessing the likelihood of other, unidentified anomalies within the functional areas 104 of the software project 102, on the basis of the quality indicators 106. The foregoing examples of quality indicators 106 are not exhaustive, and other types of quality indicators 106 may also be collected during the development of the software project 102.

The collected quality indicators 106 are normalized (110) to yield normalized quality indicators 112. Each quality indicator 106 is normalized to the coverage of the functional area 104 of the software project 102 to which the quality indicator 106 in question corresponds. Large functional areas 104 can have more tests run, and therefore more quality indicators 106 indicative of anomalies, than smaller functional areas 104. Similarly, a quality indicator 106 more substantially covering a given functional area 104 than another quality indicator 106 is more likely to indicate anomalies than a quality indicator 106 that less substantially covers the functional area 104 in question. Normalizing each quality indicator 106 to the coverage of its corresponding functional area 104 ensures that anomaly identification is not biased towards quality indicators 106 covering larger functional areas 104 and/or that more completely cover their corresponding functional areas 104.

A quality indicator 106 can be normalized to the coverage of the functional area 104 of the software project 102 to which the quality indicator 106 corresponds based on the size of the program code to which the quality indicator 106 relates. A quality indicator 106 relating to a larger amount of program code will therefore be scaled more than a quality indicator 106 relating to a smaller amount of program code. The program code to which a corresponding functional area 104 for a quality indicator 106 pertains is thus used to normalize the quality indicator 106, in consideration of the amount of this program code and the extent to which the quality indicator 106 covers the program code. The values of the quality indicators 106 are thus adjusted so that they are more consistently considered when identifying anomalies within the software project 102.

As a concrete example, a first quality indicator 106 may be indicative of the number of program code commits to a first functional area 104, whereas a second quality indicator 106 may be indicative of the number of program code commits to a second functional area 104. The first functional area 104 may have more lines of program code than the second functional area 104, and therefore is larger in size than the second functional area 104. To normalize the quality indicators 106 to coverages of their respective functional areas 104, the number of program code commits of each quality indicator 106 may be divided by the number of program code lines of its respective functional area 104. Therefore, the first quality indicator 106 is adjusted more than the second quality indicator 106, because the first functional area 104 that the first quality indicator 106 covers has more program code lines than the second functional area 104 that the second quality indicator 106 covers. The number of program code lines in this respect is considered a normalization weight by which a quality indicator 106 is weighted for normalization purposes.

Figure 2:
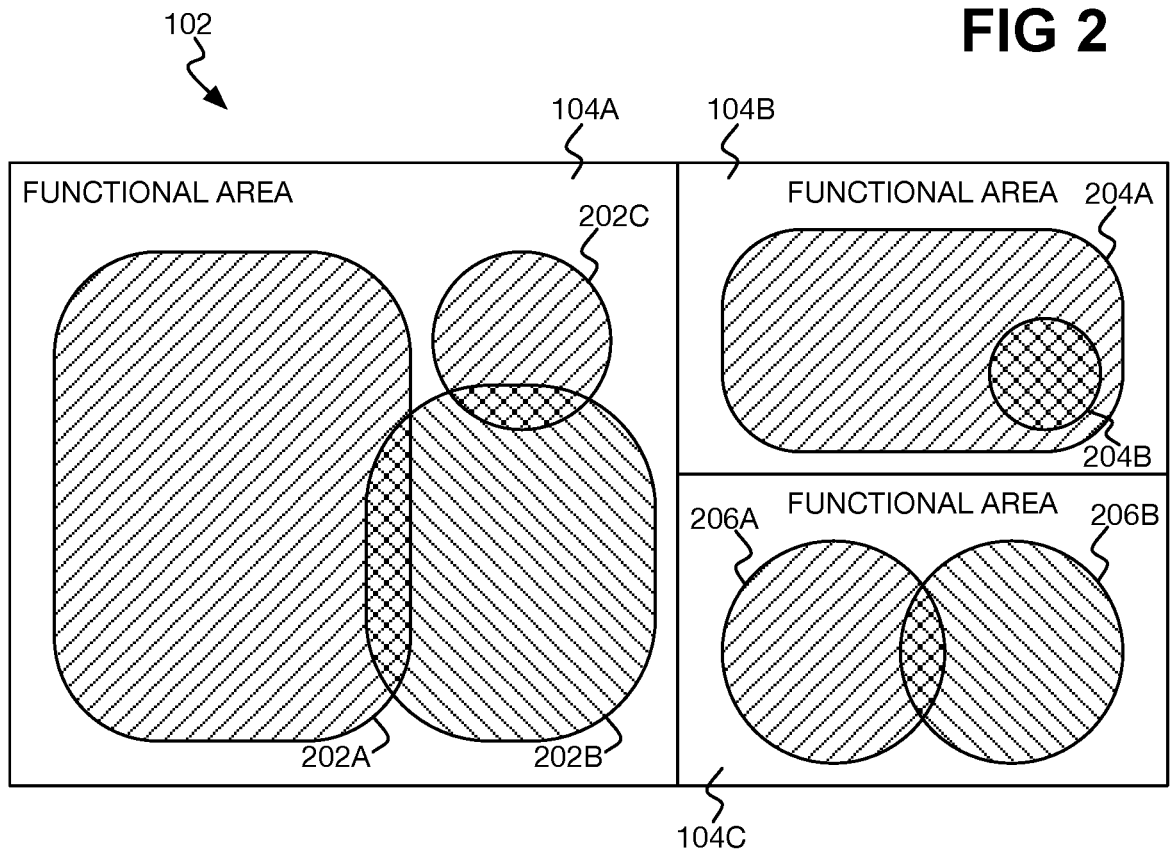
FIG. 2 is a diagram depicting how different example quality indicators can have different coverages of respective functional areas of a software project under development.

FIG. 2 illustratively depicts example quality indicator normalization as to a software project 102 having three functional areas 104A, 104B, and 104C, which are collectively referred to as the functional areas 104. The functional area 104A is larger in size than the functional areas 104B and 104C, in that the software project 102 may have more lines of program code to realize the functional area 104A than either functional area 104B or 104C. Quality indicators 202A, 202B, and 202C, collectively referred to as the quality indicators 202, have coverages of the functional area 104A as depicted in the figure, with the quality indicator 202A having greater coverage of the functional area 104A than the quality indicator 202B, and the quality indicator 202B having greater coverage than the quality indicator 202C. Further, the quality indicator 202A overlaps the quality indicators 202B and 202C in coverage of the functional area 104A. The quality indicators 202 are normalized based on their respective coverages of the functional area 104A, such that the quality indicator 202A is adjusted more than the quality indicator 202B, which is adjusted more than the quality indicator 202C.

Quality indicators 204A and 204B, collectively referred to as the quality indicators 204, have coverages of the functional area 104B as depicted in FIG. 2. The quality indicator 204A has greater coverage of the functional area 104B than the quality indicator 204B, and completely overlaps the quality indicator 204B in coverage. The quality indicators 204 are also normalized based on their respective coverages of the functional area 104B, such that the quality indicator 204A is adjusted more than the quality indicator 204B. Note, too, that quality indicator normalization is based in this respect on the overall functional area size as well. For example, even though the coverage of the functional area 104A by the quality indicator 202A is less than the coverage of the functional area 104B by the quality indicator 204A, because the functional area 104A is larger the functional area 104B, the quality indicator 202A may be adjusted more during normalization than the quality indicator 204A.

Quality indicators 206A and 206B, collectively referred to as the quality indicators 206, have coverages of the functional area 104C as depicted in FIG. 2. The extent to which the quality indicator 206A covers the functional area 104C is equal to the extent to which the quality indicator 206B covers the functional area 104C. That is, although the quality indicators 206 cover different portions of the functional area 104C except for an overlapping part of the functional area 104C, the percentage of the functional area 104C covered by the quality indicator 206A is equal to the percentage covered by the quality indicator 206B. As noted above, quality indicator normalization is based on overall functional area size as well, meaning, for example, that though each quality indicator 206 covers more of the functional area 104C than the quality indicator 202B does the functional area 104A, the quality indicator 202B may be adjusted more during normalization than either quality indicator 206.

Referring back to FIG. 1, once the collected quality indicators 106 have been normalized (110) as the normalized quality indicators 112, the normalized quality indicators 112 may be combined (114) in various ways to yield combined normalized quality indicators 116, which are additional normalized quality indicators. For example, different pairs or other sets of test normalized quality indicators 112 may be multiplied, divided, added, subtracted, and so on, in different ways. Such combined normalized quality indicators 116 may provide for anomaly identification where the individual normalized quality indicators 112 do not. The combined normalized quality indicators 116 are thus included (118) with the normalized quality indicators 112 to yield the normalized quality indicators 120 on which basis anomaly identification can subsequently be performed.

Figure 3:
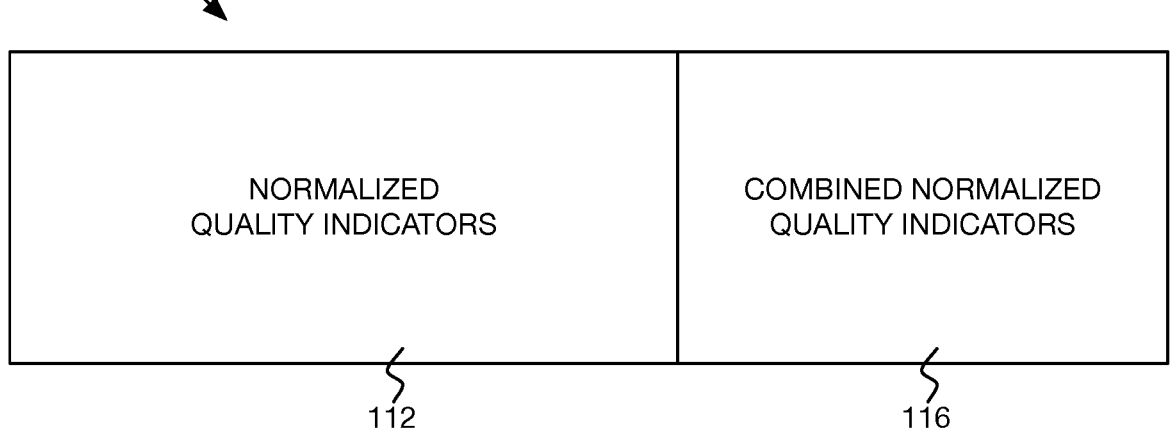
FIG. 3 is a diagram depicting how example normalized quality indicators can be supplemented with combined normalized quality indicators.

FIG. 3 illustratively depicts the normalized quality indicators 120 in this respect. The normalized quality indicators 120 include both the collected (individual) normalized quality indicators 112 and the combined normalized quality indicators 116 that are generated by combining the normalized quality indicators 112 in various ways. In the example, the normalized quality indicators 112 make up more of the normalized quality indicators 120 than the combined normalized quality indicators 116 do. However, in other implementations, there may be more combined normalized quality indicators 116 than normalized quality indicators 112. The sets of normalized quality indicators 112 and combined normalized quality indicators 116 are thus joined together to make up the set of normalized quality indicators 120.

Referring back to FIG. 1, distributions of values 122 are calculated (124) for the normalized quality indicators 120. Each normalized quality indicator 120 has a distribution of values 122. The distribution of values 122 for a normalized quality indicator 120 includes the values that have been collected for that normalized quality indicator 120 during development of the software project 102. For a given software project 102, some normalized quality indicators 120 may have values that change little if any, resulting in much narrower distributions of values 122 than other normalized quality indicators 120. Normalized quality indicators 120 having little variation in their distributions of values 122 are unlikely to have predictive value in anomaly identification, since the introduction of an anomaly may not result in the values of such quality indicators 120 changing.

Therefore, the normalized quality indicators 120 can be pruned (126) based on their distributions of values 122, yielding normalized quality indicators 128 from which those normalized quality indicators 120 unlikely to have predictive value in anomaly identification have been removed.

Figure 4:
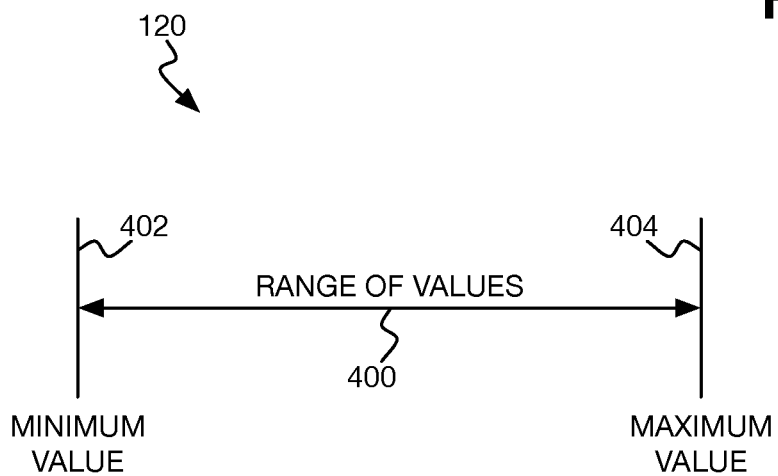
FIG. 4 is a diagram depicting an example distribution of values of a normalized quality indicator.

FIG. 4 illustratively depicts an example range 400 of values for a normalized quality indicator 120 that can serve as the distribution of values 122 of that quality indicator 120. The normalized quality indicator 120 has collected (and normalized) values that span from a minimum value 402 at one end of the range 400 to a maximum value 404 at the other end of the range 400. In one implementation, any normalized quality indicator 120 for which the range 400 of values is less than a threshold may be removed as unlikely to have predictive value in anomaly identification. That is, if the maximum value 404 minus the minimum value 402 for a given normalized quality indicator 120 is less than this threshold, then the normalized quality indicator 120 in question is removed and not included within the normalized quality indicators 128.

Figure 5:
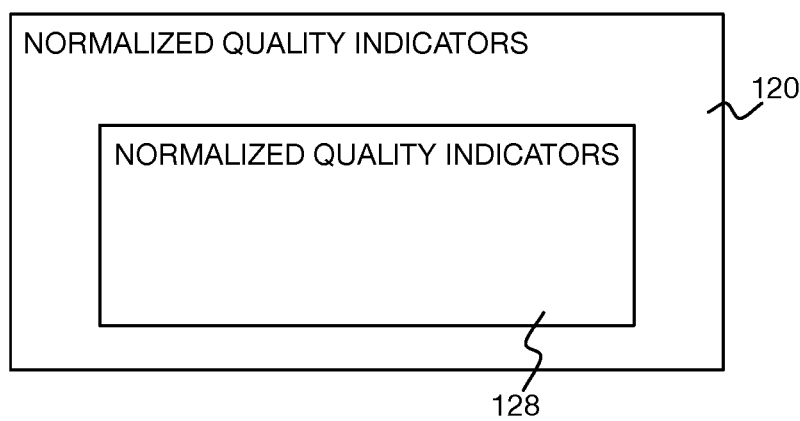
FIGS. 5 and 6 are diagram depicting example pruning of normalized quality indicators.

FIG. 5 illustratively depicts example pruning of the normalized quality indicators 120 on the basis of their distributions of values 122 to yield the normalized quality indicators 128. Not all of the normalized quality indicators 120 are expected to have distributions of values 122 that have predictive value in anomaly identification. Therefore, to the extent that some of the normalized quality indicators 120 are removed, the resulting normalized quality indicators 128 are a subset of all the normalized quality indicators 120, as depicted in the figure.

Referring back to FIG. 1, the normalized quality indicators 128 can be correlated (130) with previously identified anomalies 132 within the software project 102 to yield anomaly indicative values 134. The anomaly indicative value 134 for a normalized quality indicator 128 corresponds to the probability that the normalized quality indicator 128 is revelatory of unidentified anomalies of the software project 102. For example, the values of a normalized quality indicator 128 can be correlated with the identification of anomalies 132 within the functional area 104 to which the normalized quality indicator 128 pertains, as covered by the quality indicator 128. If identification of such anomalies 132 results in changes in the normalized quality indicator 128 in question, the normalized quality indicator 128 will have greater correlation (and thus a higher anomaly indicative value 134) than a normalized quality indicator 128 that does not change with identification of the anomalies 132.

The normalized quality indicators 128 can also be self-correlated (136)—i.e., correlated with one other—to yield correlation values 138. For example, each unique pair of normalized quality indicators 128 may be correlated with one another to determine a corresponding correlation value 138 for that pair. More generally, unique sets of two or more normalized quality indicators 128 may each be correlated with one another to determine a corresponding correlation value 138 for that set. Normalized quality indicators 128 that are correlated with one another in this respect are unlikely to independently have predictive value in anomaly identification. For example, if a first normalized quality indicator 128 has high correlation with a second normalized quality indicator 128, then if the first quality indicator 128 is indicative of an anomaly, the second test will be in the same way, too, and vice-versa. Therefore, both normalized quality indicators 128 do not have to be considered when subsequently identifying anomalies within the software project 102 under development.

The normalized quality indicators 128 can thus be pruned (140) based on their anomaly indicative values 134 and/or based on the correlation values 138 to yield normalized quality indicators 142. In one implementation, normalized quality indicators 128 having anomaly indicative values 134 less than a first threshold may be removed and not remain part of the normalized quality indicators 142. Additionally or instead, in another implementation, for each set of normalized quality indicators 128 having a correlation value 138 greater than a (different) second threshold, all but one of the quality indicators 128 of the set in question may be removed and not remain part of the normalized quality indicators 142. For example, for each unique pair of normalized quality indicators 128 having a correlation value 138 greater than the second threshold, one of the two quality indicators 128 of that pair may be removed. That is, one of the two indicators 128 is selected to retain, with the other indicator 128 being removed. Which normalized quality indicator 128 is selected for retention may be achieved randomly, or in a different manner.

Figure 6:
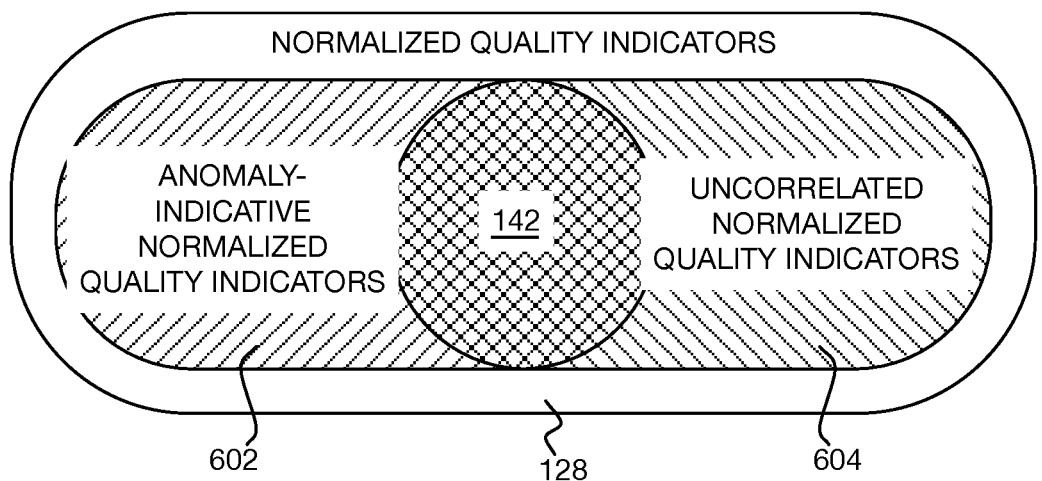

FIG. 6 illustratively shows the pruning of the normalized quality indicators 128 on the basis of their anomaly indicative values 134 and on the basis of the correlation values 138 to yield the normalized quality indicators 142. The normalized quality indicators 128 include anomaly-indicative normalized quality indicators 602 that have anomaly indicative values 134 greater than the first threshold. The normalized quality indicators 602 are thus the normalized quality indicators 128 that remain after pruning on the basis of the anomaly indicative values 134.

The normalized quality indicators 128 further include uncorrelated normalized quality indicators 604. The uncorrelated normalized quality indicators 604 are those normalized quality indicators 128 that remain after pruning to remove all but one normalized quality indicator 128 from each unique set of normalized quality indicators 128 having a correlation value 138 greater than the second threshold. In one implementation, the normalized quality indicators 128 that remain after pruning on the basis of both the anomaly indicative values 134 and the correlation values 138 are the normalized indicators 142 that are each an anomaly-indicative normalized quality indicator 602 and an uncorrelated normalized quality indicator 604.

Referring back to FIG. 1, the normal behavior of each normalized quality indicator 142 is estimated (144), yielding normal values 146 for the normalized quality indicators 142. The normal value 146 of a normalized quality indicator 142 may be the typical value of the normalized quality indicator 142 when there are no anomalies within the functional area 104 covered by that normalized quality indicator 142. The normal value 146 of a normalized quality indicator 142 can be determined from historical values of the normalized quality indicator 142, as collected during the development of the software project 102. For example, the normal value 146 of a normalized quality indicator 142 may be calculated as the mean or median of the historical values of the normalized quality indicator 142 in question.

Departure values 148 are then calculated (150) for the normalized quality indicators 142 based on the normal values 146 of the normalized quality indicators 142. For each normalized quality indicator 142, the departure value 148 is calculated as indicative of the extent to which a current value of the normalized quality indicator 142, as most recently collected during development of the software project 102, departs from the normal value 146 of that normalized quality indicator 142. The departure value 148 for a normalized quality indicator 142 may be calculated in a number of different ways. The departure value 148 may be calculated as the absolute difference between the current value of the normalized quality indicator 142 and the normal value 146 of that normalized quality indicator 142. The departure value 148 may instead be calculated as the standard deviation of the normalized quality indicator 142, a calculation that considers and thus is based on both the current value and the normal value 146 of that normalized quality indicator 142.

The departure values 148 for the normalized quality indicators 142 can be weighted (152) by their anomaly indicative values 134 to yield weighted departure values 154. The weighted departure value 154 for a normalized quality indicator 142 can be calculated as the departure value 148 for the normalized quality indicator 142 multiplied by the anomaly indicative value 134 for that normalized quality indicator 142. A normalized quality indicator 142 having a greater departure value 148 than another normalized quality indicator 142 means that the former normalized quality indicator 142 varies more from its normal behavior than the latter normalized quality indicator 142 does. While such departure from normal behavior may be indicative of an anomaly within the software project 102, to the extent that a normalized quality indicator 142 has a higher anomaly indicative value 134, the greater the likelihood that such departure from normal behavior is anomaly-indicative. Therefore, weighting the departure values 148 for the normalized quality indicators 142 by their respective anomaly indicative values 134 provides weighted departure values 154 that are more revelatory of unidentified anomalies of the software project 102.

Figure 7:
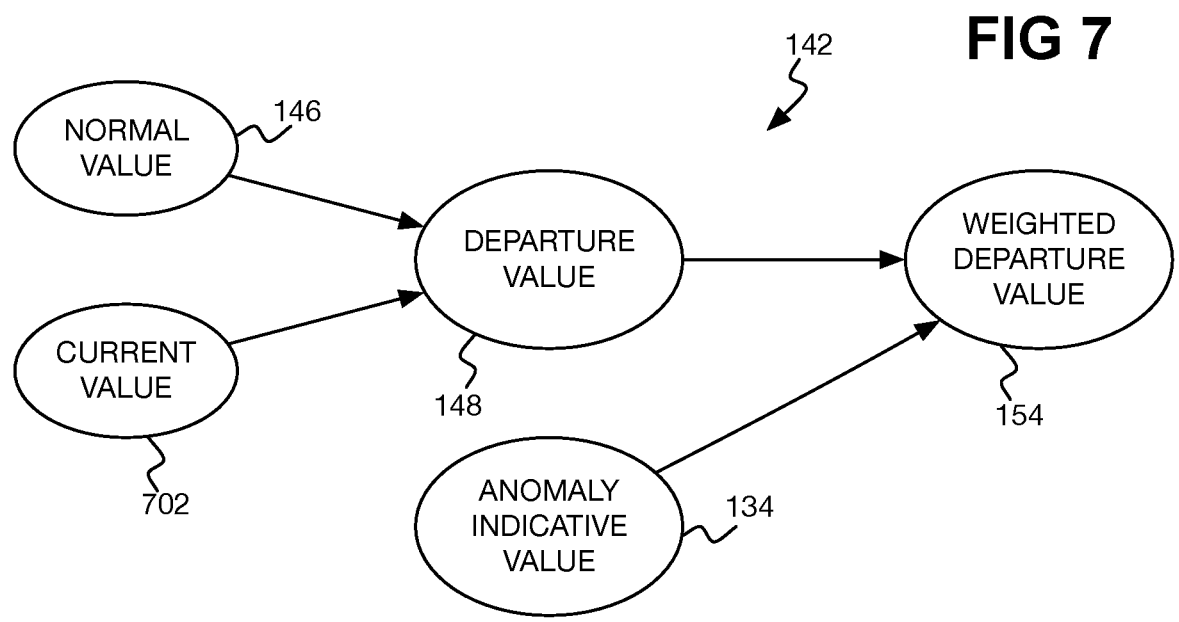
FIG. 7 is a diagram depicting how an example weighted departure value for a normalized quality indicator can be calculated.

FIG. 7 illustratively shows calculation of the weighted departure value 154 for a normalized quality indicator 142. The departure value 148 for the normalized quality indicator 142 is calculated based on the normal value 146 of the normalized quality indicator 142 and (at least) the current value 702 of the normalized quality indicator 142. As noted, the normal value 146 is an estimation of the normal behavior of the normalized quality indicator 142, and the departure value 148 indicates the extent to which (the current value 702 of) the normalized quality indicator 142 departs from such estimated normal behavior. The departure value 148 can then be weighted by the anomaly indicative value 134 for the normalized quality indicator 142 to yield the weighted departure value 154. As also noted, the anomaly indicative value 134 correspond to the probability that the normalized quality indicator 142 is revelatory of unidentified anomalies of the software project 102.

Referring back to FIG. 1, anomaly scores 156 for the functional areas 104 of the software project 102 are calculated (158) based on the weighted departure values 154 of their corresponding normalized quality indicators 142. That is, for each functional area 104, an anomaly score 156 is calculated from the weighted departure values 154 for those normalized quality indicators 142 that correspond to (i.e., cover) the functional area 104 in question. For example, the average of the weighted departure values 154 for the normalized quality indicators 142 corresponding to a functional area 104 may be calculated as the anomaly score 156 for that functional area 104. The anomaly score 156 for a functional area 104 of the software project 102 is indicative of the likelihood of an unidentified anomaly within the functional area 104 in question. The higher the anomaly score 156, the more likely the functional area 104 having that anomaly score 156 may have an unidentified anomaly. Therefore, the program code functional areas 104 having the highest anomaly scores 156, or the functional areas 104 for which the anomaly scores 156 are greater than a threshold, may be subjected to heightened inspection to determine whether they have defects causing the anomalous behavior.

Figure 8:
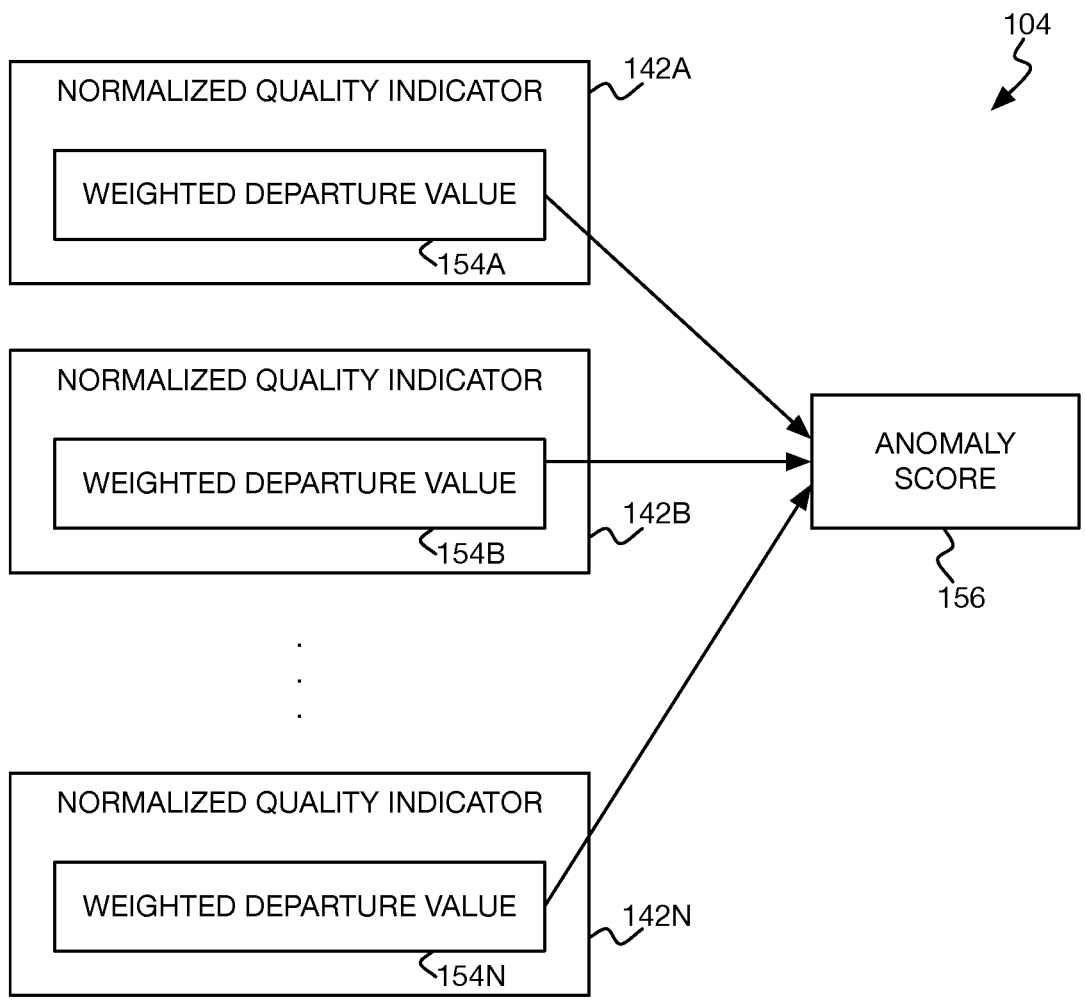
FIG. 8 is a diagram depicting how an example anomaly score for a functional area of a software project can be calculated.

FIG. 8 illustratively shows example calculation of an anomaly score 156 for a functional area 104 of the software project 102. There are normalized quality indicators 142A, 142B, ..., 142N, collectively referred to as the normalized quality indicators 142, which correspond to the functional area 104 in question, in that the normalized quality indicators 142 cover this functional area 104. The normalized quality indicators 142, 142B, ..., 142N respectively have weighted departure values 154A, 154B, ..., 154N, which are collectively referred to as the weighted departure values 154. The anomaly score 156 for the functional area 104 is thus calculated based on the weighted departure values 154 for the normalized quality indicators 142 corresponding to the functional area 104, such as the average of these weighted departure values 154.

Referring back to FIG. 1, a remedial action may be performed (160) regarding the functional areas 104 of the software project 102 based on their anomaly scores 156. For instance, a remedial action may be performed regarding each functional area 104 having an anomaly score 156 greater than a threshold. The program code of the software project 102 causing the unidentified anomaly within the functional area 104 may be identified. For example, to the extent that the anomaly score 156 for a functional area 104 is based on the weighted departure values 154 of normalized quality indicators 142 corresponding to that functional area 104, which of these quality indicators 142 have the highest weighted departure value 154 may be identified as contributing to the anomaly score 156. The program code of the software project 102 that these identified normalized quality indicators 142 cover can then be identified as that which is likely causing the unidentified anomaly within the functional area 104 in question.

Performing the remedial action can include resolving the unidentified anomaly within the identified program code. For example, the program code may be subjected to error analysis and correction to identify and correct any specified errors in an automated manner. An error analysis and correction program may be able to automatically identify and correct certain types of program code errors, for instance, without developer assistance or interaction. Performing the remedial action can additionally or instead include automatically performing additional tests on the identified program code or the functional area 104 in question to acquire and thus provide further information regarding the unidentified anomaly. For example, more thorough but time consuming tests may be run just for those functional areas 104 having anomaly scores 156 greater than the threshold. Overall development of the software project 102 is thus not unnecessarily slowed down by running these tests on all the functional areas 104, including those that are not likely to include unidentified anomalies.

The process 100 that has been described as to generation of the anomaly scores 156 for the functional areas 104 of the software project 102 under development considers quality indicators 106 collected for the software project 102 that are subjected to normalization. As described, the normalization of the quality indicators 106 results in normalized quality indicators 112 that are then used for the remaining parts of the process 100. However, the quality indicators 106 can be normalized in the generation of the anomaly scores 156 for the functional areas 104 in different ways as well. For example, a normalization weight may be calculated or otherwise generated for each quality indicator 106 that is indicative of the extent to which the quality indicator 106 in question covers its corresponding functional area 104. Rather than multiplying the quality indicator 106 by the normalization weight to yield a corresponding normalized quality indicator 112, the normalization weight may be used later in the process 100, however. For instance, how a quality indicator 142 departs from its normal behavior can be weighted by both this normalization weight and the anomaly indicative value 134 for the quality indicator 142. That is, the departure value 148 for the quality indicator 142 may be weighted by both its normalization weight and anomaly indicative value 134 to yield the weighted departure value 154 for the quality indicator 142.

Figure 9:
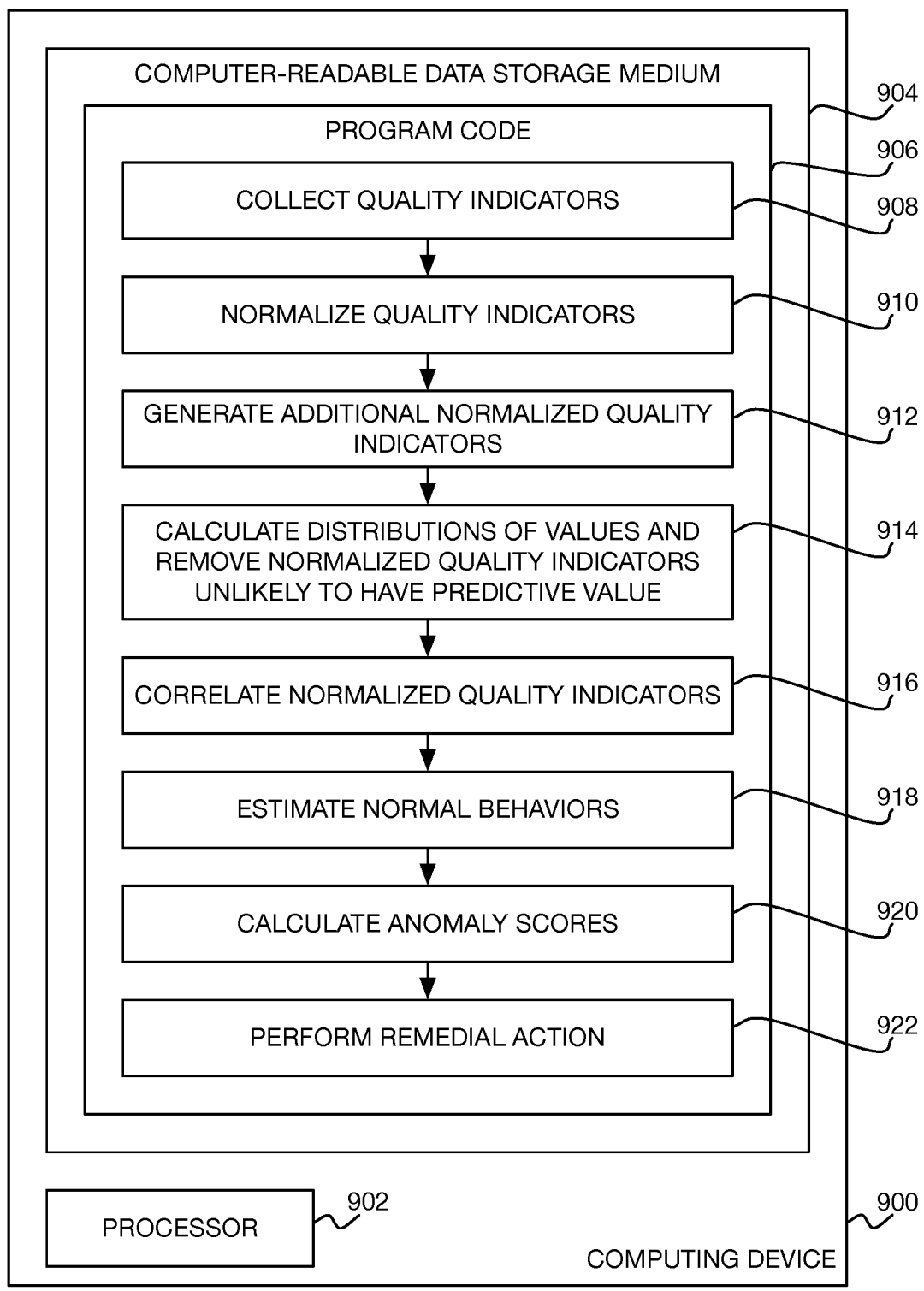
FIG. 9 is a diagram of an example computing device for identifying anomalies within a software project under development.

FIG. 9 shows an example computing device 900 for identifying anomalies within a software project 102 under development. The computing device 900 may be a server, desktop, laptop, or notebook computer, for instance. The computing device 900 may be one of the computing devices on which the software project 102 is being tested and/or developed, or may be another computing device. The computing device 900 can include a processor 902 and a non-transitory computer-readable data storage medium 904, such as a memory. The computer-readable data storage medium 904 stores program code 906 that is executable by the processor 902 to perform processing (e.g., a method).

The processing includes collecting quality indicators 106 regarding the software project 102 under development that has the functional areas 104 (908). The processing includes normalizing each quality indicator 106 to a coverage of the functional area 104 of the software project 102 to which the quality indicator 106 corresponds (910), yielding a normalized quality indicator 112. The processing can include generating additional normalized quality indicators 116 (912) that each combine a number of the normalized quality indicators 112 that have been collected. The additional (i.e., combined) normalized quality indicators 116 are included with the normalized quality indicators 112 to yield the normalized quality indicators 120. The processing includes calculating a distribution of values 122 of each normalized quality indicator 120, and removing each normalized quality indicator 120 for which the distribution of values 122 is unlikely to have predictive value in anomaly identification (914). The result of such pruning is a set of normalized quality indicators 128.

The processing includes correlating the normalized quality indicators 128 (916), on which basis the normalized quality indicators 128 can be pruned to yield the normalized quality indicators 142. The normalized quality indicators 128 are correlated to previously identified anomalies 132 of the software project 102, yielding an anomaly indicative value 134 for each normalized quality indicator 128 corresponding to a probability that the normalized quality indicator 128 is revelatory of unidentified anomalies of the software project 102. The normalized quality indicators 128 can also be correlated to one another, yielding correlation values 138 for unique sets of normalized quality indicators 128. The normalized quality indicators 128 can be pruned on the basis of the anomaly indicative values 134 and/or the correlation values 138 to yield the normalized quality indicators 142.

The processing includes estimating a normal behavior for each normalized quality indicator 142 (918). For each functional area 104 of the software project 102, the processing includes calculating an anomaly score 156 indicative of a likelihood of an unidentified anomaly within the functional area 104 (920). The calculation of the anomaly score 156 is based on, for each normalized quality indicator 142 corresponding to the functional area 104 in question, how the normalized quality indicator 142 departs from the estimated normal behavior for the normalized quality indicator 142 as weighted by the anomaly indicative value 134 for the normalized quality indicator 142. The processing can include performing remedial actions regarding each functional area 104 of the software project 102 for which the anomaly score 156 is greater than a threshold (922).

Techniques have been described for identifying anomalies within a software project under development. Specifically, the techniques identify the likelihood that each functional area includes an unidentified anomaly. The described techniques in this respect calculate an anomaly score for each functional area of the software project. The anomaly score is calculated in a way that does not require manual and subjective inspection by a quality assurance expert or other user. The anomaly score is further calculated in a way that does not require a supervised algorithm or model, and thus does not require laborious collection of training data that may be incomplete or prone to error. The techniques therefore improve the technology of software development, by permitting software projects to be developed more quickly in a defect-free manner.

We claim:

1. A non-transitory computer-readable data storage medium storing program code executable by a processor to perform processing comprising:

collecting a plurality of quality indicators regarding a software project under development that has a plurality of functional areas;

normalizing each quality indicator to a coverage of a functional area of the plurality of functional areas of the software project to which the quality indicator corresponds;

correlating each normalized quality indicator to previously identified anomalies of the software project, such that a first normalized quality indicator that changes upon anomaly identification has greater correlation to the previously identified anomalies than a second normalized quality indicator that does not change, yielding an anomaly indicative value for each normalized quality indicator corresponding to a probability that the normalized quality indicator is revelatory of unidentified anomalies of the software project;

for each normalized quality indicator, estimating a normal behavior that is indicative of a value of the normal quality indicator when no anomalies are present within the functional area covered by the normalized quality indicator;

for each normalized quality indicator, weighting the estimated normal behavior for the normalized quality indicator by the anomality indicative value for the normalized quality indicator to yield a weighted estimated normal behavior for the normalized quality indicator; and for each functional area of the software project, calculating an anomaly score indicative of a likelihood of an unidentified anomaly within the functional area, based on, for each normalized quality indicator corresponding to the functional area, how the normalized quality indicator departs from the weighted estimated normal behavior for the normalized quality indicator.

2. The non-transitory computer-readable data storage medium of claim 1, wherein the processing further comprises:

performing a remedial action regarding each functional area of the software project for which the anomaly score is greater than a threshold.

3. The non-transitory computer-readable data storage medium of claim 2, wherein performing the remedial action comprises:

identifying code of the software project causing the unidentified anomaly.

4. The non-transitory computer-readable data storage medium of claim 2, wherein performing the remedial action comprises:

resolving the unidentified anomaly within code of the software project.

5. The non-transitory computer-readable data storage medium of claim 2, wherein performing the remedial action comprises:

identifying normalized quality indicators contributing to the anomaly score.

6. The non-transitory computer-readable data storage medium of claim 2, wherein performing the remedial action comprises:

performing additional tests to provide further information regarding the unidentified anomaly.

7. The non-transitory computer-readable data storage medium of claim 1, wherein normalizing each quality indicator to the coverage of the functional area of the software project to which the quality indicator corresponds comprises:

generating a normalization weight for each quality indicator that is indicative of an extent to which the quality indicator covers the functional area to which the quality indicator corresponds, wherein how each normalized quality indicator departs from the estimated normal behavior for the normalized quality indicator is weighted by the normalization weight in addition to the anomaly indicative value when calculating the anomaly score indicative of the likelihood of the unidentified anomaly within the functional area to which the quality indicator corresponds.

8. The non-transitory computer-readable data storage medium of claim 1, wherein the processing further comprises:

generating a plurality of additional normalized quality indicators, each additional normalized quality indicator combining a number of normalized quality indicators that have been collected, wherein the additional normalized quality indicators are included within the normalized quality indicators that are subsequently correlated and that the normal behavior of each of which is subsequently estimated for calculation of the anomaly score for each functional area of the software project.

9. The non-transitory computer-readable data storage medium of claim 1, wherein the processing further comprises:

calculating a distribution of values of each normalized quality indicator; and removing each normalized quality indicator for which the distribution of values is unlikely to have predictive value in anomaly identification.

10. The non-transitory computer-readable data storage medium of claim 9, wherein removing each normalized quality indicator for which the distribution of values is unlikely to have predictive value in anomaly detection comprises:

removing each normalized quality indicator for which a range between a maximum value of the distribution of values and a minimum value of the distribution of values is less than a threshold.

11. The non-transitory computer-readable data storage medium of claim 1, wherein the processing further comprises:
correlating normalized quality indicators to one another; and
for each set of the normalized quality indicators that are correlated to one another by more than a threshold, removing the normalized quality indicators of the set other than a selected normalized quality indicator of the set to retain just the selected normalized quality indicator of the set.

12. The non-transitory computer-readable data storage medium of claim 1, wherein the processing further comprises:
calculating a correlation between each of a plurality of unique pairs of the normalized quality indicators; and
for each unique pair of the normalized quality indicators between which the correlation is greater than a threshold, removing one of the normalized quality indicators of the unique pair.

13. The non-transitory computer-readable data storage medium of claim 1, wherein the estimated normal behavior of each normalized quality indicator is estimated based on historical values of the normalized quality indicator when no anomalies are present within the functional area covered by the normalized quality indicator.

14. The non-transitory computer-readable data storage medium of claim 13, wherein each quality indicator corresponds to a different type of data that is collectable during testing of the software project,
wherein collecting the quality indicators comprises, for each quality indicator, collecting values of the different type of data to which the quality indicator corresponds;
wherein normalizing each quality indicator comprises normalizing the values of the different type of data to which the quality indicator corresponds,
and wherein the historical values of each normalized quality indicator are the normalized values of the different type of data to which the normalized quality indicator corresponds that have been previously collected.

15. The non-transitory computer-readable data storage medium of claim 14, wherein, for each functional area of the software project, calculating the anomaly score indicative of the likelihood of the unidentified anomaly within the functional area comprises:
for each normalized quality indicator corresponding to the functional area, calculating a weighted departure value indicative of an extent to which a current value of the normalized quality indicator departs from the weighted estimated normal behavior for the normalized quality indicator, wherein the current value of the normalized quality indicator is a normalized value of the different type of data to which the normalized quality indicator corresponds that has been most recently collected;
calculating the anomaly score based on the weighted departure value for each normalized quality indicator corresponding to the functional area.

16. The non-transitory computer-readable data storage medium of claim 15, wherein calculating the departure value indicative of the extent to which the current value of the normalized quality indicator departs from the weighted estimated normal behavior for the normalized quality indicator comprises:
calculating an absolute difference between the current value of the normalized quality indicator and the estimated normal behavior for the normalized quality indicator, as the weighted departure value.

17. The non-transitory computer-readable data storage medium of claim 15, wherein calculating the anomaly score based on the weighted departure value for each normalized quality indicator corresponding to the functional area comprises:
calculating an average of the weighted departure value for each normalized quality indicator corresponding to the functional area, as the anomaly score.

18. A computing device comprising:
a processor; and
a non-transitory computer-readable data storage medium storing program code executable by the processor to:
collect a plurality of quality indicators regarding a software project under development that has a plurality of functional areas;
normalize each quality indicator of the plurality of quality indicators to a coverage of the functional area of the software project to which the quality indicator corresponds;
calculate a distribution of values of each normalized quality indicator;
remove each normalized quality indicator for which the distribution of values is unlikely to have predictive value in anomaly identification;
correlate the normalized quality indicators to one another;
for each set of the normalized quality indicators that are correlated to one another by more than a threshold, remove the normalized quality indicators of the set other than a selected normalized quality indicator of the set to retain just the selected normalized quality indicator of the set;
correlate the normalized quality indicators to previously identified anomalies of the software project, such that a first normalized quality indicator that changes upon anomaly identification has greater correlation to the previously identified anomalies than a second normalized quality indicator that does not change, yielding an anomaly indicative value for each normalized quality indicator corresponding to a probability that the normalized quality indicator is revelatory of unidentified anomalies of the software project;
for each normalized quality indicator, estimate a normal behavior that is indicative of a value of the normal quality indicator when no anomalies are present within the functional area covered by the normalized quality indicator;
for each normalized quality indicator, weight the estimated normal behavior for the normalized quality indicator by the anomality indicative value for the normalized quality indicator to yield a weighted estimated normal behavior for the normalized quality indicator; and
for each functional area of the software project, calculate an anomaly score indicative of a likelihood of an unidentified anomaly within the functional area, based on, for each normalized quality indicator corresponding to the functional area, how the normalized quality indicator departs from the weighted estimated normal behavior for the normalized quality indicator.

19. The computing device of claim 18, wherein the stored program code is executable by the processor to further:
perform a remedial action regarding each functionality area of the software project for which the anomaly score is greater than an anomaly threshold.

20. A method comprising:
collecting, by a processor, a plurality of quality indicators regarding a software project under development that has a plurality of functional areas;
normalizing, by the processor, each quality indicator to a coverage of the functional area of the software project to which the quality indicator corresponds;
calculating, by the processor, a distribution of values of each normalized quality indicator;
generating, by the processor, a plurality of additional normalized quality indicators, each additional normalized quality indicator combining a number of normalized quality indicators that have been collected;
removing, by the processor, each normalized quality indicator for which the distribution of values is unlikely to have predictive value in anomaly identification;
correlating, by the processor, the normalized quality indicators to one another; and
for each set of the normalized quality indicators that are correlated to one another by more than a threshold, removing, by the processor, the normalized quality indicators of the set other than a selected normalized quality indicator of the set to retain just the selected normalized quality indicator of the set;
correlating, by the processor, the normalized quality indicators to previously identified anomalies of the software project, such that a first normalized quality indicator that changes upon anomaly identification has greater correlation to the previously identified anomalies than a second normalized quality indicator that does not change, yielding an anomaly indicative value for each normalized quality indicator corresponding to a probability that the normalized quality indicator is revelatory of unidentified anomalies of the software project;
for each normalized quality indicator, estimating, by the processor, a normal behavior that is indicative of a value of the normal quality indicator when no anomalies are present within the functional area covered by the normalized quality indicator;
for each normalized quality indicator, weighting, by the processor, the estimated normal behavior for the normalized quality indicator by the anomality indicative value for the normalized quality indicator to yield a weighted estimated normal behavior for the normalized quality indicator;
for each functional area of the software project, calculating, by the processor, an anomaly score indicative of a likelihood of an unidentified anomaly within the functional area, based on, for each normalized quality indicator corresponding to the functional area, how the normalized quality indicator departs from the weighted estimated normal behavior for the normalized quality indicator; and
performing a remedial action regarding each functionality area of the software project for which the anomaly score is greater than an anomaly threshold.

\* \* \* \* \*